US007733658B1

(12) United States Patent
Perkins, III et al.

(10) Patent No.: US 7,733,658 B1
(45) Date of Patent: Jun. 8, 2010

(54) INTEGRATED POWER SUPPLY AND PLATFORM FOR MILITARY RADIO

(75) Inventors: Frank Norvel Perkins, III, Huntsville, AL (US); Jeffrey Keith Taylor, Joppa, AL (US); Bruce Charles Weddendorf, Huntsville, AL (US); Lloyd W. Childs, Owens Cross Roads, AL (US)

(73) Assignee: Perkins Technical Services, Inc., Huntsville, AL (US)

( * ) Notice: Subject to any disclaimer, the term of this patent is extended or adjusted under 35 U.S.C. 154(b) by 660 days.

(21) Appl. No.: 11/748,770

(22) Filed: May 15, 2007

Related U.S. Application Data

(63) Continuation-in-part of application No. 10/895,683, filed on Jul. 21, 2004, now Pat. No. 7,227,755, which is a continuation-in-part of application No. 10/017,411, filed on Dec. 14, 2001, now Pat. No. 6,784,570.

(51) Int. Cl.
*H05K 5/00* (2006.01)
(52) U.S. Cl. ...................................... 361/752; 361/800
(58) Field of Classification Search ................. 361/729, 361/800, 752, 797; 439/131, 119
See application file for complete search history.

(56) References Cited

U.S. PATENT DOCUMENTS

| 4,882,655 | A | | 11/1989 | Pavie |
| 5,604,663 | A | | 2/1997 | Shin et al. |
| 5,611,701 | A | | 3/1997 | Hahn |
| 5,627,450 | A | | 5/1997 | Ryan et al. |
| 5,636,112 | A | * | 6/1997 | Faulk ........................... 363/48 |
| 5,687,061 | A | | 11/1997 | Mesfin et al. |
| 5,913,926 | A | * | 6/1999 | Anderson et al. ............... 714/6 |
| 5,924,877 | A | * | 7/1999 | Byrne et al. ................. 439/101 |
| 5,966,285 | A | | 10/1999 | Sellers |
| 6,040,681 | A | | 3/2000 | May |
| 6,163,086 | A | | 12/2000 | Choo |
| 6,191,553 | B1 | | 2/2001 | Feng-Jung |
| 6,272,016 | B1 | | 8/2001 | Matonis et al. |
| 6,309,230 | B2 | | 10/2001 | Helot |
| 6,341,218 | B1 | | 1/2002 | Poplawsky et al. |
| 6,453,378 | B1 | | 9/2002 | Olson et al. |
| 6,491,278 | B1 | | 12/2002 | Thomsen |
| 6,604,199 | B1 | | 8/2003 | Yang et al. |
| 6,975,511 | B1 | | 12/2005 | Lebo et al. |

* cited by examiner

*Primary Examiner*—Hung S Bui
(74) *Attorney, Agent, or Firm*—David E. Mixon; Frank M. Caprio; Bradley Arant Boult Cummings LLP

(57) ABSTRACT

A power platform assembly is provided to convert available AC power into power suitable to power SINCGARS radio components. The platform includes a horizontal base for supporting up to two SINCGARS radios and a carriage assembly supported above the base to provide support for up to two radio frequency power amplifiers. Connectors, internal wiring, and electrical components inside the platform provide power and electrical connections between components within and connected to the platform. Ancillary electronics and connectors provide for remote audio monitoring of communications via an LS-671 external speaker, or equivalent external speaker arrangement. The platform allows various types of available AC power, as may vary across different regions of the world, to power the radios and radio frequency power amplifiers while allowing others in a secure vicinity of the platform to hear incoming and outgoing voice transmissions without draining the batteries powering the radios.

34 Claims, 6 Drawing Sheets

INTEGRATED POWER SUPPLY AND PLATFORM FOR MILITARY RADIO

This application is a continuation in part of U.S. Ser. No. 10/895,683, filed Jul. 21, 2004 now U.S. Pat. No. 7,227,755, which is a continuation in part of U.S. Ser. No. 10/017,411, filed Dec. 14, 2001 now U.S. Pat. No. 6,784,570. Both prior applications are incorporated herein in their entireties by reference.

FIELD OF THE INVENTION

The present invention relates generally to an integrated power supply and docking platform. In particular, the present invention relates to an integrated power supply and docking platform for a radio and a radio frequency power amplifier, for forming a single physical platform with integrated power electronics.

BACKGROUND OF THE INVENTION

In the early 1990's a new family of VHF-FM combat net radios was adopted by the American military; known as Single Channel Ground and Airborne Radio System, commonly referred to as "SINCGARS." SINCGARS radios were designed to provide the primary means of communications and control for infantry and armored vehicles, and artillery units, all in coordination with naval and air support, and are designed on a modular basis to achieve maximum commonality among the various ground airborne system configurations of the armed forces. The SINCGARS radios have the capability to transmit and receive voice, as well as, tactical data and are consistent with NATO interoperability requirements. SINCGARS systems operate on any of 2320 channels between 30 and 88 megahertz and are designed to survive in a nuclear environment. Communication security ("COMSEC") for SINCGARS are provided by use of the VISON encryption device and are operable in hostile environments for the use of electronic counter measures ("ECCM"). SINCGARS achieve significant reductions in physical space and power supply requirements over the prior versions of standard man pack and vehicular radios.

SINCGARS provide commanders with a highly reliable, secure, easily maintained combat net radios that have both voice and data handling capabilities in support of command and control operations. Together with internet controller capabilities, and communications links to other airborne defense communication centers (e.g. Hawkeye airborne communication centers) multi-task force inter-operability is achieved.

Communications and especially radio communications is the lifeline of the U.S. military forces. SINCGARS radios and their associated equipment are employed to accomplish various communication requirements during unit mission operations and, typically, require man pack or vehicular mounts for mobile utilization. The primary radios utilized by the Armed Forces are receiver transmitter versions RT-1523A through RT-1523F and 1523F with an attached waveform expansion module such as offered by ITT Aerospace/Communications Division under the trade name "SIDEHAT", but other physical configurations exist in the full range of SINCGARS radio models, such as: ground ICOM radios using receiver-transmitter ("RT") RT-1523, RT-1523A, RT-1523B, RT-1523C, RT-1523D, and RT-1523E; receiver-transmitter RT-1523 series ANNRC-87A/D/F through AN/VRC-92A/D/F and AN/PRC-119 SINCGARS, SINCGARS AST. Radio frequency power amplifiers ("RFPAs") are often used to extend the transmission range of the SINCGARS radio transmitters, especially in command post communications roles. For example, the model AM7238BNRC RFPA is used to amplify the radio frequency output of a radio from its standard output of about 5 watts to 50 watts. Thus extending the transmission range dramatically for a SINCGARS radio, albeit with additional power drain and increased current requirements.

In a typical peacetime situation, a SINCGARS radio operator will obtain required communications gear from a communications or supply depot. A man pack outfit will usually include a main power battery in addition to the SINCGARS radio components. Vehicular SINCGARS radio outfits may also include a dismount radio, including a main power battery, to enable dismounting and removal of the SINCGARS radio from the vehicle.

Both man pack and dismount configurations require batteries for the main power source and for digital memory retention within the radio itself. Actual battery life varies depending upon storage history, operational environment, communications demand, and functional selections within a radio's features. However, typical battery life is between 9 and 11 hours on a single battery charge, depending upon use load.

The SINCGARS RT-1523 series of radios are designed for the non-technical operator and for ease of operation for functioning in a hyperactive tactical environment. Once a radio had been put into operation and its operator has entered the communications net, there are few requirements for the operator to perform. Nominal input power requirement for a SINCGARS radios are 11-16 volts direct current, which are supplied by rechargeable on-board batteries. A competent communications operator must obviously monitor the battery status of each radio under his or her care and keep the units sufficiently charged for each intended mission so that a radio will not become inoperative during a critical stage of a mission.

However, recharging of SINCGAR'S radio batteries can be inconvenient and even unavailable in some mission applications, especially in remote and undeveloped regions of the world. Interestingly, the SINCGARS radio is designed such that specialized recharging units are required to recharge their internal batteries. Many mission applications utilizing SINCGARS radios, including training, are well within local proximity of standard 110/220 Volt AC electrical outlets. However, a standard AC electrical outlet is useless to SINCGARS radio without additional specialized recharging equipment, which is fairly bulky. Further, radio frequency amplifiers are frequently used to extend the transmission field of each SINCGARS radio for command post or fire control centers, which requires additional power. A SINCGARS radio's inability to utilize standard 110/220 Volt AC outlets limits its usefulness, especially in training missions, and can hamper the success of a mission when power duration of internal batteries are stretched and recharging units are not readily available.

Therefore, what is needed is a lightweight, versatile, and inexpensive docking platform for SINCGARS radios that will allow for powering of a SINCGARS radio while utilizing available AC power outlets offering 85-260 Volts at 47-440 Hz, and also provide for the incorporation and powering of frequency amplifiers for command post and fire control center operations.

SUMMARY OF THE INVENTION

In summary, the invention consists of a power conversion platform having a substantially flat-based portion including a taller rear portion extending upward from the rear of the primary base portion and being formed integrally therefrom. Dual connectors extend forward from the front surface of the rear portion and are adapted for connecting with recessed male connectors found on the rear of a SINCGARS radio. Internal electronics within the platform converts various types of available AC power ranging from 85-260 Volts AC at 47-440 Hz, as AC power is known to vary across different regions of the world, into a +12 Volts DC source, which is standard for SINCGARS radios. The internal electronics provide separate conversion power supplies for two connectors to allow for two SINCGARS radios to be powered simultaneously. The invention also includes switches for controlling the powering of any installed SINCGARS radio as well as shock absorbing stops on the front face of the rear base portion. Retention latches are positioned on the front of the unit to allow for secure retention of the two SINCGARS radio mounted on the invention while recharging and powering. An integrated carriage frame assemble is also provided to support up-to two radio frequency power amplifiers position above each installed SINCGARS radio, and two separate electrical connectors are also provided on the carriage to allow full electrical integration of an amplifier with its radio counterpart.

Other features, objects and advantages of the present invention will become apparent from a reading of the following description as well as a study of the appended drawings.

BRIEF DESCRIPTION OF THE DRAWINGS

A power platform assembly incorporating the features of the invention is depicted in the attached drawings which form a portion of the disclosure and wherein.

DESCRIPTION OF THE PREFERRED EMBODIMENTS

Figure 1:
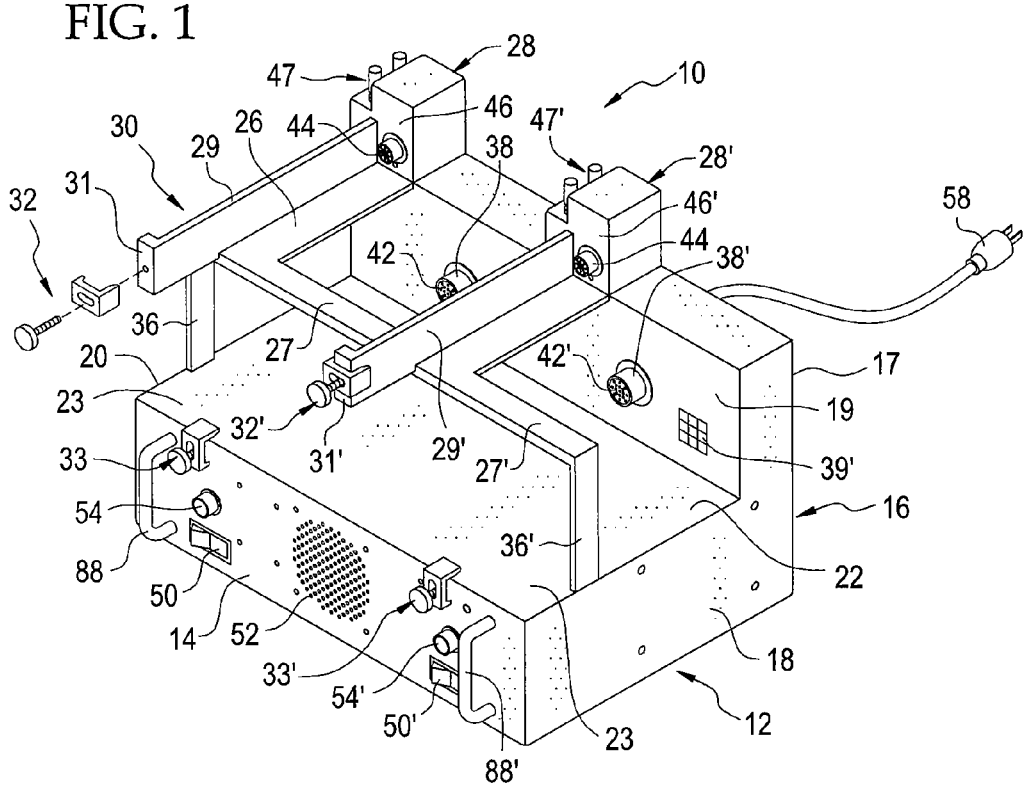
FIG. 1 is a perspective view of the preferred embodiment of the invention.
Figure 2:
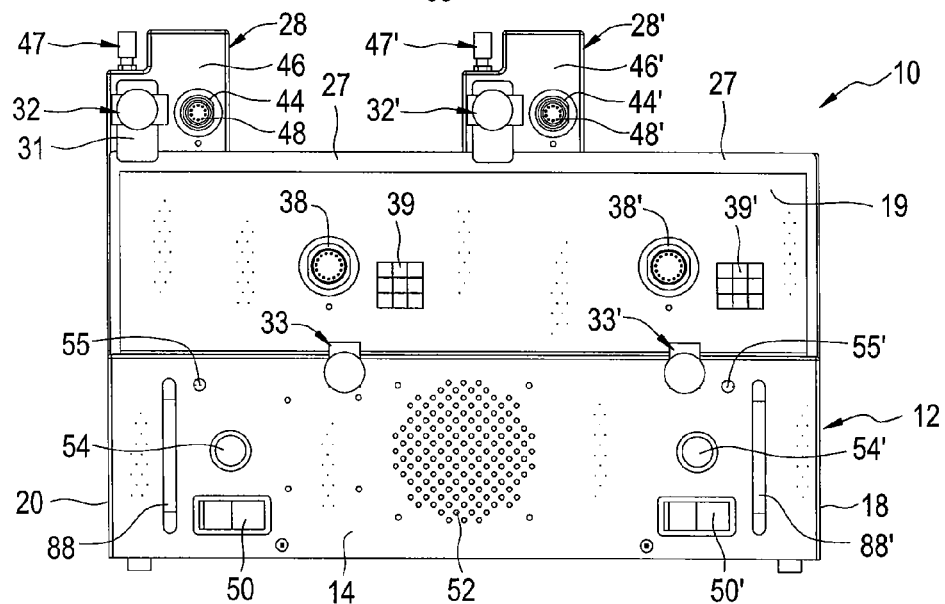
FIG. 2 is a front elevation view of the invention.
Figure 3:
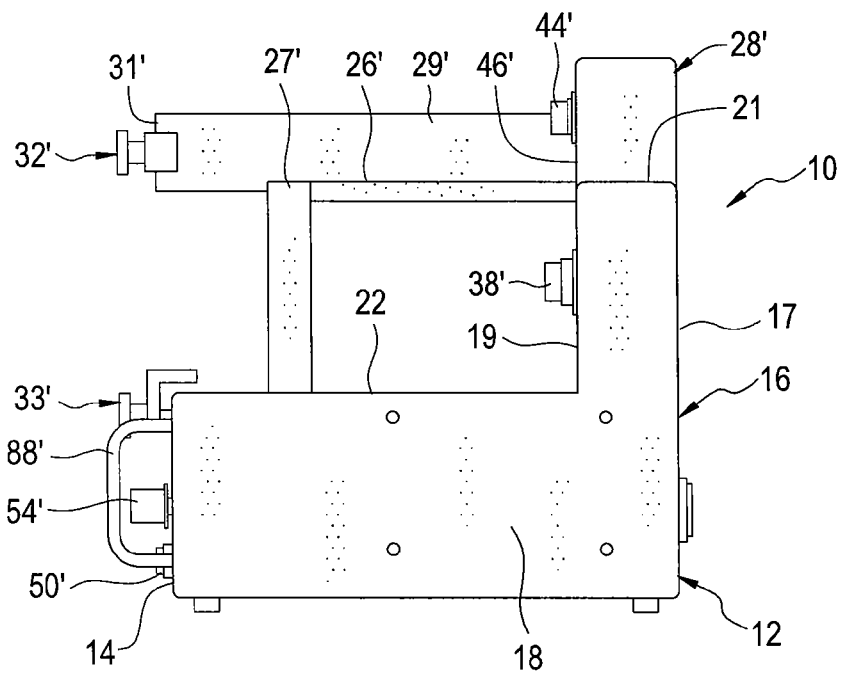
FIG. 3 is a side elevation view of the invention.
Figure 4:
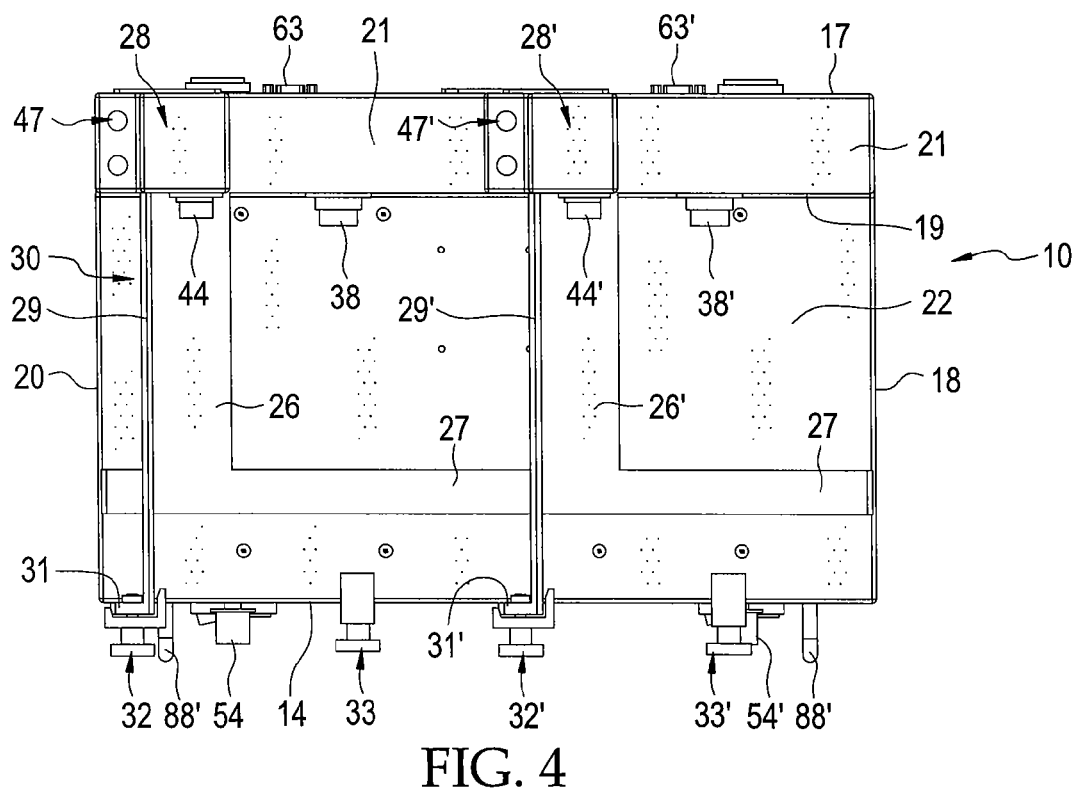
FIG. 4 is a plan view of the invention.
Figure 5:
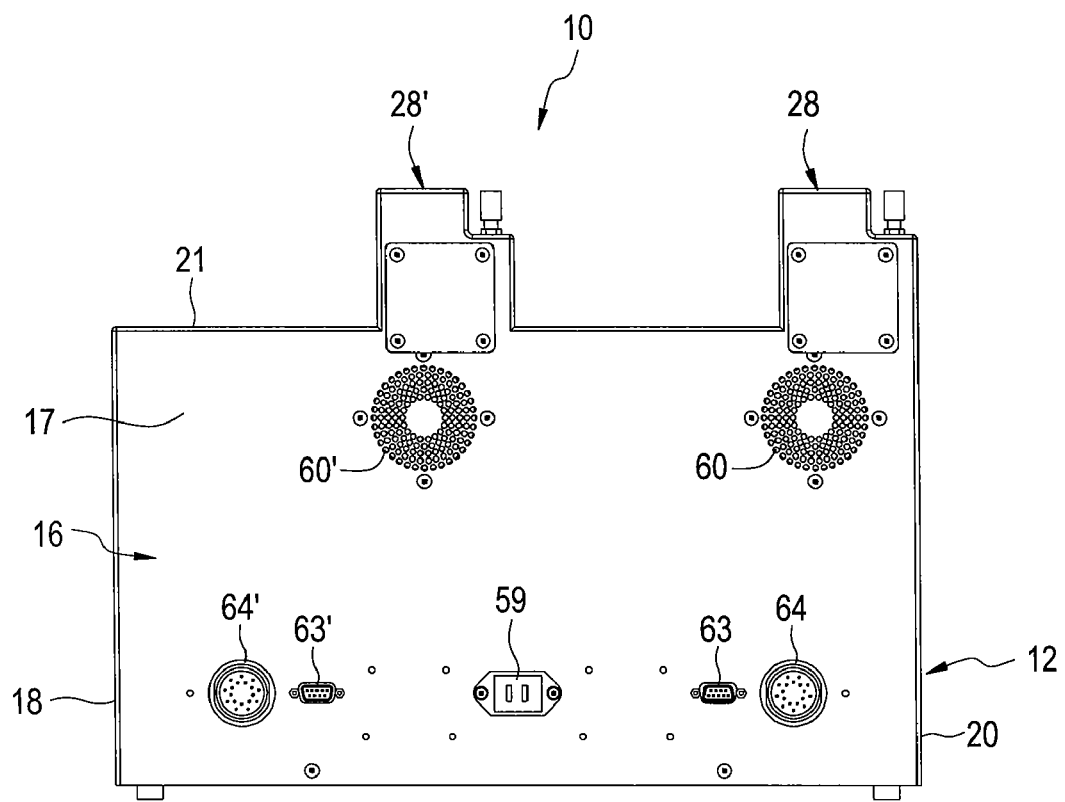
FIG. 5 is a back elevation view of the invention.

The preferred embodiment of the present invention is illustrated in FIGS. 1-6, where like portions share like numbering. As illustrated at FIGS. 1 through 5, a power platform 10, in accordance with the presently preferred embodiment, includes a base 12 having a front side 14, a back portion 16, opposing lateral sides 18 and 20 and a top side 22. Top side 22 is configured to simultaneously support two SINCGARS radios 24 adjacent to one another. Top side 22 presents a substantially flat, horizontal platform 23 for supporting two SINCGARS radios 24 and for supporting an integral carriage assemble 30 that in turn supports two RFPAs 25. Rear surface 17 of back portion 16 extends upward above top side 22 and back portion 16 forms a 90 degree angle to top side 22 forming an integral "L" shaped surface 19 with platform 23 as shown.

Integral with top surface 21 of rear portion 16 are a pair of lateral support structures 26, 26' extending forward from top surface 21 at the juncture of towers 28, 28' and top surface 21. Support members 26, 26' are integrally connected at right angles with transverse, lateral braces 27, 27' and are supported at the sides of platform 23 with vertical braces 36, 36'. A pair of support runners 29, 29' rest upon and are rigidly affixed to supports members 26, 26' and terminate in a retention latch flange 31, 31', and latch and screw 32, 32'. Generally, these carriage supports and braces are made of durable metal to withstand shock and rough treatment expected in military actions, but might be made from other durable substances such as PVC.

Electrical connectors 38, 38' are positioned on forward facing surface 19 of rear member 16 and arranged thereon so that each connector 38, 38' aligns with a complementary receptor socket on the rear of a SINCGARS radio 24, when radio 24 is installed on platform 23. A suitable connector for use as first electrical connector 38 is a 14 pin radio connector type manufactured under the part number A3012769-1 by WPI Interconnect Products, Inc. of Salem, N.J. 08079 (aka "Wire Pro") and having an NSN (i.e. a national stock number or a military part number) of 5935-01-123-07052. Receptor contacts 42 are positioned within first connector 38 to receive corresponding male connectors extending within the complementary receptor socket on the rear side of SINCGARS radio 24 in accordance with government specifications established for SINCGARS radios. Shock absorbing stops 39, 39' prevent damage to radio 24 upon engagement thereof into socket 38.

A second pair of electrical connectors 44, 44' are positioned on a forward face 46 of towers 28, 28' adjacent to binding posts for remote radio operation 47 on each tower. A suitable connector for use as this second electrical connector 44 is a 26 pin radio type connector manufactured under part number A3012763-2 by WPI Interconnect Products, Inc. of Salem, N.J. 08079 (aka "Wire Pro") and having an NSN (i.e. a national stock number or military part number) of 5935-01-298-4991. Connector 44 is positioned on face 46 so that second connector 44 is in alignment with a complementary receptor socket on the rear of an RFPA 25 when installed on carriage 30. Receptor contacts 48 are positioned within second connector 44 to receive corresponding male connectors extending within the complementary receptor socket on the rear side of RFPA 25 in accordance with government specifications established for SINCGARS radios and SINCGARS radio frequency power amplifiers.

A control switch 50 is provided on front side 14 of base 12 for controlling the initiation of power for SINCGARS radio 24 and RFPA 25 when they are installed on adapter assembly 10. Front side 14 further includes a series of speaker access holes 52 and dual volume controls 54, 54' for controlling the volume of each radio. The set of speaker access holes 52 allows sound generated by a speaker 56 housed within base 12 to exit base 12 while volume control 54 controls volume output via audio amplifier and control module 72. Latch and thumb screws 33, 33' are mounted on an upper portion of front side 14 and are used to latch upon a corresponding flange on an installed SINCGARS radio, securing same upon platform 23.

Opposite front side 14, a standard power plug 58 is supported within back side 16 via access socket 59 and is adapted to plug into a standard 110/220 volt household outlet, or other available AC power outlet. Backside 16 further includes a pair of fan access grids 60, 60' to allow a flow of air through base 12 as generated by a pair of fans 62, 62'. Nine pin, DB9 serial connectors 63, 63' provide additional bi-directional serial data outputs from the radios 24 for various programmed radio functions using RS-232 protocol. Connectors 64, 64' provide a means for an external speaker with handset to be connected to the platform 10, such as when utilizing an ancillary SINCGARS loudspeaker like an Mil. Part No. LS-671, for remote audio reception of field communications to a commander or other military designate in a secondary secure audio location.

Figure 6A:
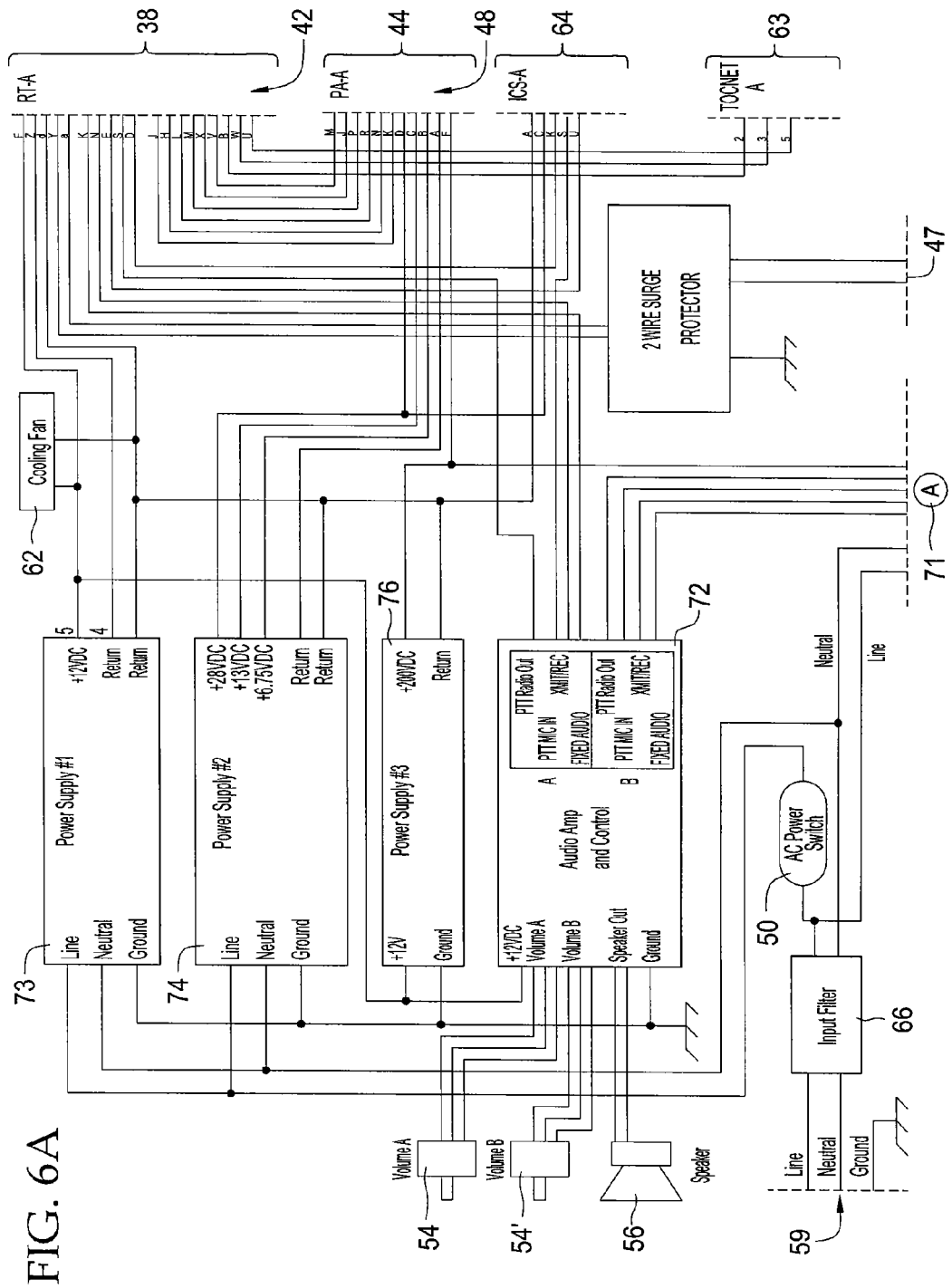
FIG. 6A is an electrical wiring diagram of a part of the electrical circuitry of the invention.
Figure 6B:
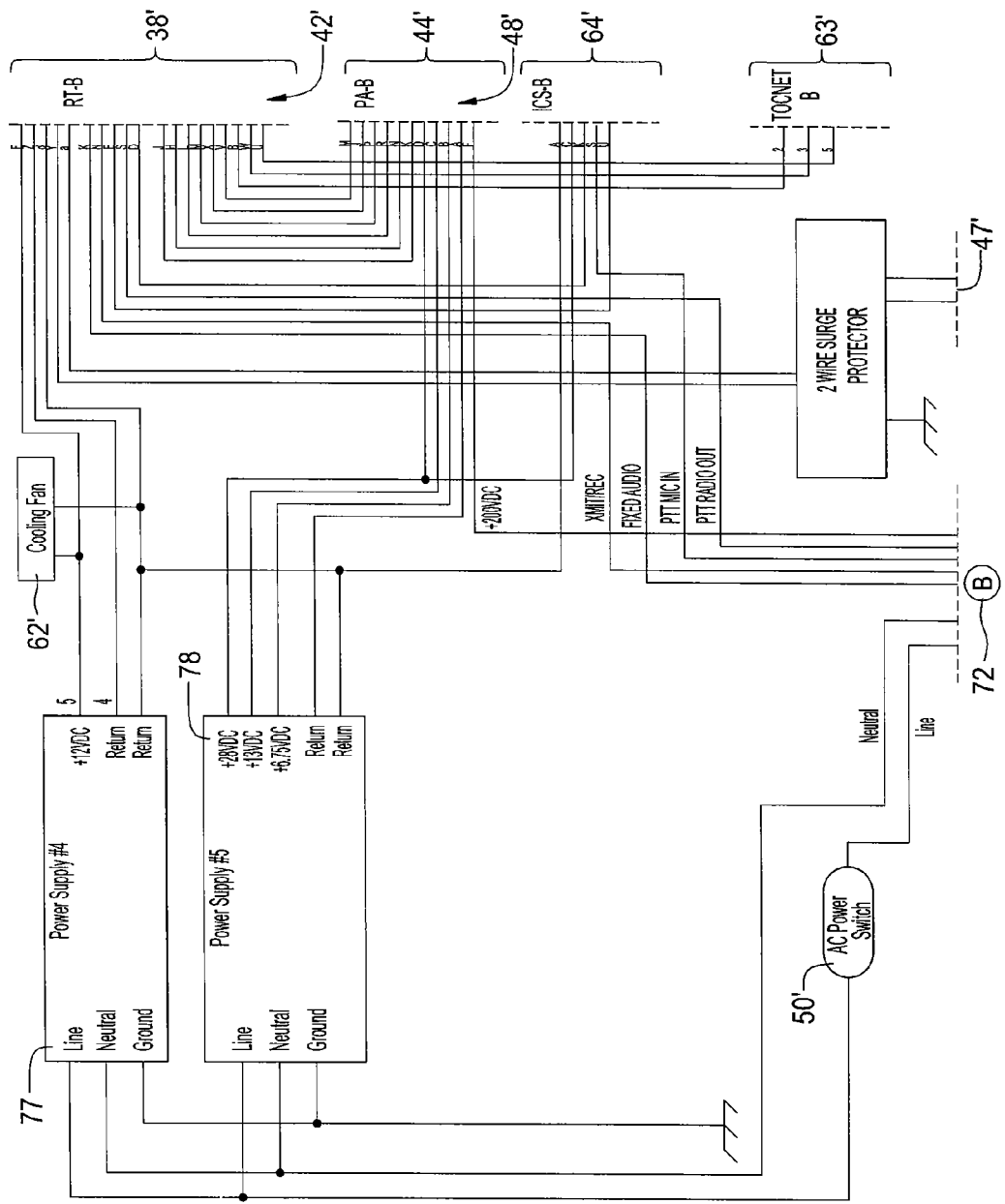
FIG. 6B is an electrical wiring diagram of the remaining part of the electrical circuitry of the invention; and, FIG. 7 is a perspective view of the invention showing two SINCGARS radios with a SideHat installed thereon and two radio frequency power amplifiers installed and supported above the two radios.

Referring now to FIGS. 6A and 6B, the preferred embodiment of the invention includes multiple power supply subsystems for converting standard household 110/220 Volt alternating current, or other available AC supply, into direct current and supplying it to up to two radios 24 and two RFPAs 25 via connectors 38, 38' and 44, 44'. Electrical connection cord 58, via connector 59, supplies input power to receiving input filter 66 to condition internal power as controlled by switches 50, 50'. As may be seen, the power switches 50, 50' are arranged within the internal wiring to allow separate on-off power controls for each SINCGARS radio RFPA pair. This configuration allows the platform 10 to independently power each radio-amplifier pair. AC Power is supplied via internal wiring to power supplies 73, 74, 77, and 78. Power supplies 1 (73), 2 (74), 4 (77), and 5 (78) convert alternating current (AC) power, as may be available, into direct current power at voltage levels required for a SINCGARS radio and outputs the converted power to connectors 38, 38' to allow for powering of two SINCGARS radio units installed or docked onto the invention 10. The power supplies also supply converted power to connectors 44, 44' to power the RFPAs and to power supply 3 (76) and audio amplifier and control module 72. Fans 62, 62' provide cooling for the internal power supplies and are positioned to vent heated internal air to ambient external atmosphere via exhaust vents 60, 60' exiting on the rear of the invention 16, as is well known in the industry. Labels A (71) and B (72) at the bottom of FIGS. 6A and 6B, respectively, are simply wiring continuation indicators between each figure, as may be understood.

Referring now to the individual power supplies in FIGS. 6A and 6B and giving consideration to the electrical line designations provided therein, power supply 1 (73) and power supply 4 (77) provide +12 VDC at 4 Amps current to the platform 10. A suitable device for power supplies 73 and 77 available on the commercial market is a MAP55-1012 offered by Power One based in Camarillo, Calif.

Power supplies 2 (74) and 5 (78) each provide to the platform 10 via the labeled electrical lines the following: +6.75±0.25 VDC @ 1.43 A max; +13.0±0.35 VDC @ 2.40 A max; and +28.0±0.50 VDC @ 5.00 A max.

Power supply 3 (76) provides to the platform 10 via the labeled electrical lines the following: +200.0 VDC 5.0 VDC @ 10 mA max. The design utilizes a MIC38C45 PWM controller manufactured by Micrel, Inc. in San Jose, Calif. and is output limited at 2 W to protect the internal transformer and FET (Field Effect Transistor) from over-current damage. A feedback control network is also utilized with an internal +5 Volt reference to regulate the output voltage.

The audio amplifier module 72 principally utilizes a five watt audio amplifier integrated circuit part number LM384N manufactured by National Semiconductor Corporation. The module 72 functions as a power amplifier and relay for electrical signals generated by each SINCGARS radio. It also operates from a +13 Volt input supply, as shown. Module 72 includes a low pass frequency output filter to reduce distortion in its output frequency and also includes protection from a short circuit. The audio amplifier 72 performs the task of monitoring up to four handsets, two on the front of the radios, and two on the remote handset/speakers (e.g. as on an LS671 unit) connected to the connectors 64, 64'. Module 72 drives remote speakers with signals received by the radios, or transmission signals received from handsets via the connectors 64, 64'. Amplifier module 72 mutes transmission signals from the radio handset which are also being provided to the remote speaker to prevent feedback loop noise. The volume of the speaker is controlled via a two resistors mounted on the front of the unit (not shown) and actuated by volume controls 54, 54'. Amplifier module 72 also provides two output signals to drive LEDs, 55, 55' present on front panel 14. LEDs provide a visual operator indicator when an audible signal is being received from a particular radio unit, and to provide an indication when a radio is in use.

Inasmuch as power supply conversions and power switch wiring are well-known in the electrical arts, further discussion regarding the electrical characteristics and properties of the internal power supplies for converting standard 110/220 volt AC, or other available AC power from various regions of the world, into direct current will not be discussed as they are not necessary for a complete understanding of the invention herein described.

Figure 7:
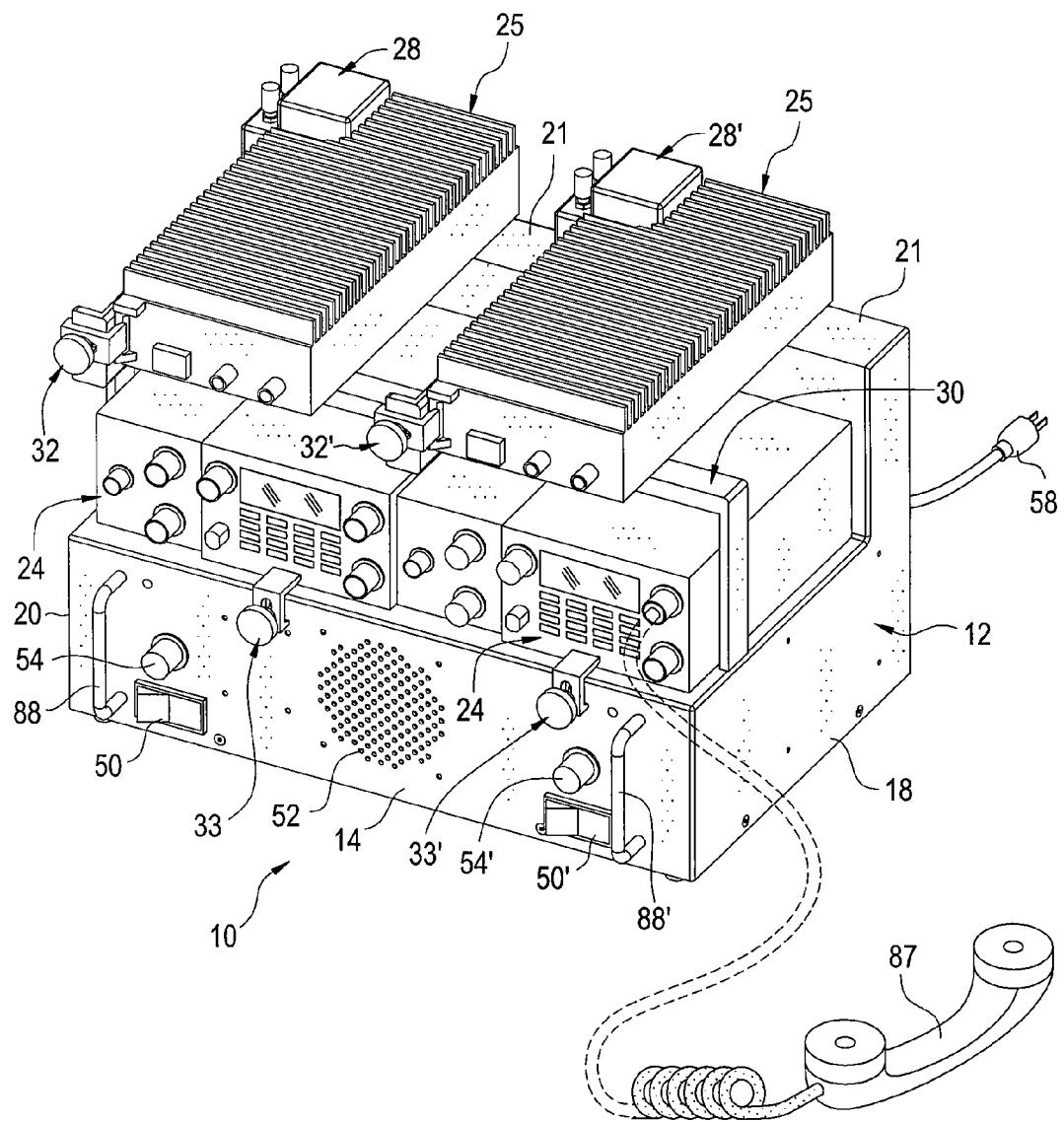

Referring now to FIG. 7, it may be seen that the platform 10 supports dual RFPAs 25, 25' on carriage assembly 30 above with, up to, two SINCGARS radios 24, 24' supported on horizontal platform 23. Radios 24, 24' and RFPAs 25, 25' are secured to invention 10 via clasps 33, 33' and 32, 32', respectively, in front, and via connectors 38, 38' and 44, 44', respectively at their rears. An adapter socket 64, 64' connects the audio output of the SINCGARS radio to an LS671 (or equivalent) remote speaker with handset to allow secure reception of audio communications, and handset 87 may be connected directly to radios 24, 24' to allow the transmission of voice communications (i.e. audio signals) to and from the radios. An additional handset 87 may also be used. Additional electrical communications also occur between the RFPAs 25 and the SINCGARS radios 24, 24' via connectors 38, 38' and 44, 44', respectively. Handles 88, 88' assist in moving platform 10 having radios and RFPAs installed thereon. The combination of the engaged RFPAs 25, 25' the SINCGARS radios 24, 24' with internal power electronics and audio controls, allows for the powering and boosting of transmission signals from the SINCGARS radios 24 while allowing others in a secure vicinity of the platform unit 10 to hear incoming and outgoing voice transmissions without draining batteries held by the radios 24, 24'.

While I have shown my invention in one form, it will be obvious to those skilled in the art that it is not so limited but is susceptible of various changes and modifications without departing from the spirit thereof. For example, various plug placements on the rear member of the invention as well as various types of socket structures can easily be anticipated to accommodate upgrades and modifications to the current SINCGARS radios used by the Armed Forces. Moreover, the configuration, thickness, and composition of the carriage assemble easily be varied to accommodate different types of radio configurations and military mission requirements. In general, it is contemplated that the invention would be varied in its physical dimensions to meet various types of SINCGARS radio configurations that exist, such as those in existing model numbers: Ground ICOM radios using receiver-transmitter (RT) RT-1523, RT-1523A, RT-1523B, RT1523C, RT-1523D, RT-1523F, and RT-1523F with SideHat; receiver-transmitter RT-1523 series AN/VRC-87A/D/F through AN/VRC-92A/D/F, and AN/PRC-119 SINCGARS, SINCGARS ASP, as well as various types of RFPAs such as the AM7238B/VRC model.

Having set forth the nature of the present invention, what is claimed is:

1. A platform assembly, comprising:
   a. a base having a front side and a back side, said base being adapted and arranged for supporting up to two SINCGARS radios and up to two radio frequency power amplifiers;
   b. a carriage assembly for supporting said up to two radio frequency power amplifiers above said base, said carriage assembly affixed to said base.
   c. a pair of connectors extending from said back side adapted and arranged for electrically connecting with said up to two SINCGARS radios;
   d. a pair of connectors positioned cooperatively with said carriage and adapted and arranged for electrically connecting with said up to two radio frequency power amplifiers;
   e. at least one power supply held within said base for converting alternating current into direct current to power said radios and said radio frequency power amplifiers; and,
   f. at least one audio amplifier held within said base for amplifying audio signals received by said SINCGARS radio.

2. The assembly as recited in claim 1, further including a second power supply for converting alternating current into direct current to power said radios and said radio frequency power amplifiers.

3. The assembly as recited in claim 2, further including a third power supply for converting alternating current into direct current to power said radios and said radio frequency power amplifiers.

4. The assembly as recited in claim 3, wherein one of said power supplies is adapted to convert alternating current into about +13 Volt direct current, about +28 Volt direct current, and about +6.75 Volt direct current.

5. The assembly as recited in claim 1, wherein said carriage assembly comprises a pair of runners extending forward from said back side for supporting said up to two radio frequency power amplifiers, said runners supported by at least one vertical brace extending upward from said base.

6. The assembly as recited in claim 5, wherein said runners are positioned to guide the installation of a radio frequency power amplifier into one of said electrical connectors cooperatively positioned with said carriage.

7. The assembly as recited in claim 1, further comprising a speaker integral with said base, said speaker being in electrical connection with said audio amplifier.

8. The assembly as recited in claim 7 wherein a volume control is electrically connected with said audio amplifier.

9. The assembly as recited in claim 1 wherein said audio amplifier includes means for electrically connecting with an external speaker.

10. The assembly as recited in claim 1, wherein said carriage assembly comprises a pair of horizontal braces extending forward from said back side, a transverse brace connecting ends of said horizontal braces at a 90 degree angle, two runners each supported by one of said horizontal braces, and two vertical supports extending upwards from said base and supporting said transverse brace at its ends thereof.

11. The assembly as recited in claim 1, further comprising a power supply adapted to convert +13 Volt direct current into +200 Volt direct current.

12. A platform assembly, comprising:
   a. a base having a front side and a back side, said base being adapted and arranged for supporting at least one SINCGARS radio and one radio frequency power amplifier;
   b. a carriage assembly for supporting said at least one radio frequency power amplifier above said radio, said carriage assembly affixed to said base;
   c. at least one power supply held within said base for converting alternating current into direct current to power said radio and said radio frequency power amplifier;
   d. at least one audio amplifier held within said base for amplifying audio signals received by said SINCGARS radio; and,
   e. said platform including electrical connectors for connecting said radio, said radio frequency power amplifier, and said power supply together.

13. The assembly as recited in claim 12, further including a second power supply for converting alternating current into direct current to power said radio and said radio frequency power amplifier.

14. The assembly as recited in claim 13, further including a third power supply for converting alternating current into direct current to power said radios and said radio frequency power amplifiers.

15. The assembly as recited in claim 14, wherein one of said power supplies is adapted to convert alternating current into about +13 Volt direct current, about +28 Volt direct current, and about +6.75 Volt direct current.

16. The assembly as recited in claim 12, wherein said carriage assembly comprises at least one runner extending forward from said back side and supported by at least one vertical brace extending upward from said base for supporting said radio frequency power amplifiers.

17. The assembly as recited in claim 16, wherein said runner are positioned to guide the installation of said radio frequency power amplifier into one of said electrical connectors, said connector cooperatively positioned with said carriage.

18. The assembly as recited in claim 17, further comprising a speaker integral with said base, said speaker being in electrical connection with said audio amplifier.

19. The assembly as recited in claim 18 wherein a volume control is electrically connected with said audio amplifier.

20. The assembly as recited in claim 19 wherein said audio amplifier includes means for electrically connecting with an external speaker.

21. The assembly as recited in claim 12, wherein said carriage assembly comprises a pair of horizontal braces extending forward from said back side, a transverse brace connecting ends of said horizontal braces at a 90 degree angle, two runners each supported by one of said horizontal braces, and two vertical supports extending upwards from said base and supporting said transverse brace at its ends thereof.

22. The assembly as recited in claim 12, further comprising a power supply adapted to convert +13 Volt direct current into +200 Volt direct current.

23. A platform assembly, comprising:
   a. a base, said base being adapted and arranged for supporting a SINCGARS radio;
   b. means supported by said base for holding a radio frequency power amplifier above said radio;
   c. electronics within said base for providing direct current to said radio and said amplifier;
   d. means for electrically connecting said radio to said amplifier; and
   e. a means for converting audio electrical signals into audibly detectable sounds, wherein said audio means is held by said base.

24. The assembly as recited in claim 23, wherein said connection means comprises electrical connectors adapted to fit sockets on a SINCGARS radio and a radio frequency power amplifier adapted to support a SINCGARS radio.

25. The assembly as recited in claim 23, wherein said holding means comprises a pair of horizontal braces extending forward from a rear portion of said base, a transverse brace connecting ends of said horizontal braces at a 90 degree angle, two runners each supported by one of said horizontal braces and adapted to engage a radio frequency power amplifier, and two vertical supports extending upwards from said base and supporting said transverse brace at its ends thereof.

26. The assembly as recited in claim 23, wherein said electronics includes a power supply adapted to convert alternating current into about +13 Volt direct current, about +28 Volt direct current, and about +6.75 Volt direct current.

27. The assembly as recited in claim 23, wherein said holding means comprises at least one runner extending forward from a rear portion of said base, said runner supported by at least one brace extending upward from said base for supporting said radio frequency power amplifier.

28. The assembly as recited in claim 27, wherein said runner is positioned to guide the installation of said radio frequency power amplifier into said connection means, said connection means cooperatively positioned with said runner for installation thereof.

29. The assembly as recited in claim 23, further comprising a speaker integral with said base, said speaker electrically connected with said electronics.

30. The assembly as recited in claim 23 wherein said base includes a volume control, said control electrically connected with said electronics.

31. The assembly as recited in claim 23, wherein said electronics includes means for electrically connecting with an external speaker.

32. The assembly according to claim 23, wherein said electronics includes a first DC power converter adapted to convert alternating current into about +12 Volt direct current, a second power converter adapted to convert alternating current into about +13 Volt direct current, about +28 Volt direct current, and about +6.75 Volt direct current, and a third power converter adapted to convert about +13 Volt direct current into about +200 Volt direct current.

33. The assembly as recited in claim 23, wherein said electronics includes a power supply adapted to convert +13 Volt direct current into +200 Volt direct current.

34. The assembly as recited in claim 23, wherein said base, said connection means, said holding means, and said electronics are adapted to power and support two SINCGARS radios and two radio frequency power amplifiers, and wherein said assembly is adapted to hold said radio frequency power amplifiers above said SINCGARS radios.

* * * * *